United States Patent [19]

Smith et al.

[11] 4,258,232
[45] Mar. 24, 1981

[54] LINE HOLD CIRCUITS

[75] Inventors: Maurice I. Smith, Carnation; John D. Gillen, Kirkland, both of Wash.

[73] Assignee: Tone Commander Systems, Inc., Redmond, Wash.

[21] Appl. No.: 42,572

[22] Filed: May 25, 1979

Related U.S. Application Data

[63] Continuation-in-part of Ser. No. 958,120, Nov. 6, 1978, abandoned.

[51] Int. Cl.³ .................... H04M 3/22; H04M 1/00
[52] U.S. Cl. ............................. 179/99 R; 179/81 R
[58] Field of Search ............ 179/18 F, 18 FA, 99, 179/18 DA, 81 R, 84 R

[56] References Cited

U.S. PATENT DOCUMENTS

| | | |
|---|---|---|
| 3,742,151 | 6/1973 | Ruether .................................. 179/99 |
| 3,870,831 | 3/1975 | McCarley ............................. 179/99 |
| 4,093,829 | 6/1978 | Silberman .......................... 179/81 R |

Primary Examiner—Thomas A. Robinson
Attorney, Agent, or Firm—Dowrey & Cross

[57] ABSTRACT

A single line hold circuit adapted for connection between the tip and ring leads of a telephone line. The circuit comprises impedance means for connection between the tip and ring leads, the impedance means including a semiconductor element having high and low impedance states, the impedance of the low impedance state being sufficiently small to maintain the telephone line in a hold condition. The circuit further comprises means for causing the semiconductor to be in its low impedance state following an interruption of a predetermined length of time in loop current. A double line hold circuit is also illustrated.

18 Claims, 3 Drawing Figures

LINE HOLD CIRCUITS

CROSS REFERENCE TO RELATED APPLICATION

This application is a continuation-in-part of application Ser. No. 958,120, filed Nov. 6, 1978, now abandoned.

BACKGROUND OF THE INVENTION

1. Field of the Invention

This invention pertains to telephone hold circuits, and in particular to single and double line hold circuits for connection across the tip and ring leads of a single telephone line or two telephone lines.

2. Description of the Prior Art

Single line hold circuits generally operate by providing a variable impedance means for connection between the tip and ring leads of a telephone line. Such means is normally in a high impedance state in which it does not affect normal telephone use. When it is desired to enter a hold mode, however, the impedance means is switched to a low impedance state in which it can maintain loop current through the line even if the telephone goes on-hook. Prior single line hold circuits have used both relays and semiconductor devices as the variable impedance means. Relay hold circuits suffer from the disadvantages that relays are bulky, expensive, and have comparatively limited operating lives. While prior single line hold circuits using semiconductors as the impedance means have not suffered from these disadvantages, they have been subject to even more basic drawbacks which have prevented them from achieving widespread acceptance in the telephone industry.

Prior semiconductor hold circuits have functioned by providing a thyristor, such as a silicon controlled rectifier, hereinafter referred to as an SCR, connected across the tip and ring leads of a telephone line. When untriggered, the SCR has a very high impedance. When it is desired to enter the hold mode, a signal is applied to the SCR gate, triggering it into a low impedance, conducting state in which it can maintain loop current despite the telephone going on-hook. The SCR will remain in its conducting state without further triggering for as long as loop current is supplied to it. However, when loop current is interrupted, even for very short intervals, the SCR immediately reverts to its high impedance state, thus taking the line out of the hold mode.

This instantaneous loss of the hold state due to short interruptions in loop current is a serious drawback present in all prior semiconductor hold circuits. To be of practical utility, a hold circuit must be able to maintain itself in a hold, i. e. low impedance, mode despite interruptions in loop current of up to several hundred milliseconds, but must automatically leave the hold mode for all interruptions of greater than 600 ms. The low limit is due to the fact that the central office or PBX to which telephone lines are connected frequently interrupt loop current for intervals of up to 300 ms. for a variety of reasons. The upper time limit corresponds to the loop current interruption which occurs when the central office or PBX switches a telephone line from an audio line to a howler circuit in response to the telephone line being off-hook or on hold for too great a period of time. When the switch to the howler circuit is made, the line must leave the hold mode, otherwise the line will be designated defective and disconnected.

Prior relay hold circuits have included means for maintaining the line in a hold mode despite interruptions in loop current of up to 300–600 ms. These circuits have operated by storing charge during hold conditions and pumping such charge through the relay coil during interruptions. There would be many practical difficulties in applying such a technique to semiconductor hold circuits, not the least of which would be that a single semiconductor device could not be utilized to match many telephone company input specifications which require that a hold circuit be suitable for use with a wide range of loop currents. The charge pumping technique also suffers from the drawback that a large amount of charge must be stored to span interruptions of 300–600 ms.

An additional requirement for a hold circuit of general utility is that the circuit have an input impedance of at least 10 megohms during non-hold conditions to satisfy FCC part 68 specifications for devices to be connected between the tip and ring terminals. Many prior single line hold circuits fail to meet this requirement.

SUMMARY OF THE INVENTION

This invention provides a single line hold circuit in which the variable impedance means comprises a semiconductor element. The circuit includes novel means for maintaining the telephone line in a hold mode in spite of interruptions of up to a predetermined period of time in loop current. The circuit has an input resistance when in a non-hold condition of at least 10 megohms and may easily be connected directly across the tip and ring leads of the telephone line without any additional interconnections.

The circuit comprises impedance means having high and low impedance states and hold maintenance means for returning the impedance means to its low impedance states after interruptions in loop current. In a preferred embodiment, the impedance means includes a thyristor and is adapted for connection across the tip and ring leads. The impedance of the thyristor in its low impedance (conducting) state is small enough to maintain the telephone line in a hold condition. The hold maintenance means comprises means for applying a triggering signal to the gate terminal of the thyristor upon resumption of loop current within a predetermined period of time after an interruption of loop current with the impedance means in its low impedance state. The hold maintenance means in effect "remembers" whether or not the telephone line was in the hold mode prior to the interruption.

In one embodiment of the invention, the impedance means further comprises a zener diode having a reverse break-down voltage of sufficient magnitude such that the voltage drop through the impedance means in its low impedance state is greater than the voltage drop between the tip and ring leads with the telephone in its off-hook position, such that the telephone line will leave the hold condition when the telephone goes off-hook. In this embodiment, the hold maintenance means includes a capacitor connected in parallel with such zener diode. During hold conditions, current flows through the zener diode and charges the capacitor to a voltage which is precisely determined by the reverse breakdown voltage of the zener diode means, and which is independent of the voltage between the tip and ring leads. This precisely charged capacitor is then used to accurately time interruptions of loop current.

A second embodiment of the invention operates in the same manner as the first with the following exceptions: The gate of the thyristor is permanently connected to the capacitor by a diode. Switching occurs when a connection between the capacitor and the cathode of the thyristor is broken allowing the gate to assume a potential different than that of the cathode. Simultaneously a resistor of high resistance is connected across the capacitor to discharge the capacitor slowly as in the above embodiment. The second embodiment allows a greater on-hook impedance than does the first embodiment as the resistor is not connected across the line during on-hook conditions.

The second embodiment allows two single line hold circuits to be connected together to form a double line hold circuit. A mechanical switch such as is common in telephone applications allows a momentary connection across the hold connection of two single line hold circuits and simultaneously connects to the selected telephone line.

These and other features, objects, and advantages of the invention will be apparent from the detailed description and claims to follow taken in conjunction with the accompanying drawings.

DETAILED DESCRIPTION OF THE INVENTION

Figure 1:
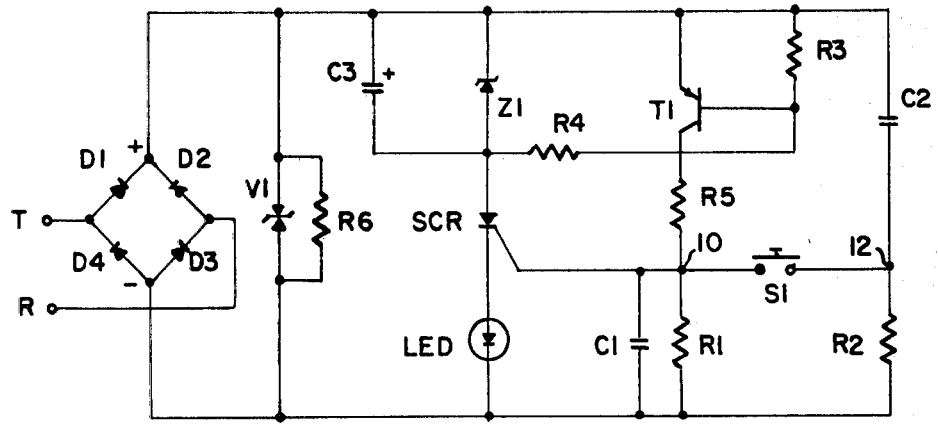
FIG. 1 is a schematic diagram of a hold circuit according to the present invention.

FIG. 1 illustrates a preferred embodiment of the hold circuit of the present invention. The circuit includes a diode bridge, consisting of diodes D1 through D4, through which the circuit is connected to the tip and ring leads T and R of a telephone line. Diodes D1–D4 have reverse breakdown voltages in excess of 400 volts. The bridge insures that the connection of the hold circuit to the tip and ring leads T and R is not polarity sensitive and also provides for protection against damage to some of the circuit elements due to incorrect polarity connection.

The hold circuit includes a varistor V1 and 10 megohm resistor R6 connected in parallel across the output of the diode bridge. The varistor has a breakdown voltage of about 200 volts or more and provides transient protection for the hold circuit without decreasing its input resistance during normal operation.

Referring to FIG. 1, a thyristor such as an SCR is utilized to provide alternate high impedance and low impedance states. Other semiconductor elements, for example a triac, could be used in place of the SCR. In the FIG. 1 embodiment, the diode bridge makes it possible to use a polarity sensitive device such as an SCR. With the SCR in a low impedance state, it provides a path for loop current such that the central office or PBX will continue the line in active status despite the telephone going on-hook. This is the hold mode. When the SCR is in a high impedance state, it draws no current and does not affect normal telephone operation. The SCR is connected in series with a light emitting diode, herein referred to as an LED having a voltage drop of about 1.2 volts and a zener diode Z1 which provides a predetermined voltage drop preferably of about 8.2 volts. The LED is used to provide a visual indication of when the circuit is in the hold mode.

When not triggered the SCR has a very high impedance. When triggered, however, it has a low impedance and produces a voltage drop of about 1.5 volts, the exact voltage drop depending upon the magnitude of current flow through it. Thus in the embodiment shown in FIG. 1, the total voltage drop across the zener diode Z1, the SCR in its conductive state, and the LED is about 10.9 volts. At higher currents, this voltage will increase a few tenths of a volt. The diode bridge provides an additional voltage drop of about 1.5 volts, bringing the total voltage drop through the circuit to about 12.4 volts when the SCR is triggered. Depending upon the magnitude of current flow, therefore, the total voltage drop through the circuit will vary from about 12.4 to about 13.3 volts.

The firing circuit for the SCR is connected to the SCR gate and includes momentary contact switch S1. One side of S1 is connected to the gate of the SCR. The other side is connected between capacitor C2 and resistor R2, as shown. Pull down resistor R1 and bypass capacitor C1 are connected to the trigger circuit, the latter making it transient insensitive. The breakdown voltage of the SCR preferably exceeds 400 volts so that ringing voltage can be applied to the circuit without firing the SCR inadvertently. Consequently, the SCR will stay in its high impedance state despite application of ringing voltages of up to 400 volts.

When the circuit is bridged across the tip and ring leads T and R, capacitor C2 charges up to a level corresponding to the voltage across the tip and ring leads (e.g. 48 volts). When the telephone set is taken off-hook, however, the voltage across the tip and ring leads drops to about 8 volts, corresponding to the apparent source voltage of the telephone set. Capacitor C2 thereupon begins to discharge via resistors R2 and R6 until the voltage across capacitor C2 is also about 8 volts. Upon closure of the contacts of switch S1 with the telephone set in its off-hook condition (capacitor C2 at 8 volts), points 10 and 12 are brought to the same potential. This potential is insufficient to trigger the SCR, which thus remains in its high impedance state. When the telephone set is returned to its on-hook condition with switch S1 depressed, however, the voltage across the tip and ring leads begins to climb towards 48 volts. As capacitor C2 now begins to charge back up to 48 volts, an absolute voltage of 40 volts is momentarily established at point 12 and hence point 10 via switch S1. An effective gate voltage of 40 volts is thus applied to the SCR, which now fires and causes a voltage drop of about 13 volts to appear across the circuit, as described above, to place the circuit in the hold mode.

When the contacts of switch S1 are released after the telephone set has resumed on-hook status, capacitor C2 discharges until returning to a steady state value of 13 volts. When the telephone set is taken off-hook once again, the voltage across the tip and ring leads again drops to 8 volts. The current path through the zener diode Z1, the SCR and the LED is now starved of current and the SCR switches to its high impedance state because it has insufficient current to sustain it in its conductive state. The circuit has now left the hold mode, and capacitor C2 discharges from its 13 volt level down to the 8 volt level corresponding to the voltage across the tip and ring leads T and R.

With the SCR in its non-conductive or high impedance state, the input resistance of the circuit is determined by varistor V1 and resistor R6. Consequently, below the breakdown voltage of V1, the circuit exhibits an input impedance of 10 megohms, the resistance of R6. This feature enables the circuit to satisfy FCC part 68 specifications for devices to be bridged across the tip and ring leads. Resistor R6 may not be omitted or made arbitrarily large, because it is necessary to provide a discharge path for capacitor C2 when the telephone is taken off-hook, as described above.

The circuit of the present invention includes hold maintenance means for retaining memory following interruption of loop current for a predetermined time. If loop current is restored within such time period, the SCR is retriggered. If this time period is exceeded before restoration of loop current, the SCR is not retriggered and the circuit leaves the hold mode. The hold maintenance means does not create an undesirable leakage path across the tip and ring leads, and therefore permits the hold circuit to satisfy FCC part 68 regulations.

The hold maintenance means operates by causing a trigger voltage to be applied at point 10 independently of switch S1 and capacitor C2. The hold maintenance means includes a transistor T1 and a capacitor C3 which stores sufficient charge during off-hook intervals to retrigger the SCR at the appropriate time following restoration of loop current after an interruption thereof for a predetermined time period. Resistors R3 and R4 are respectively connected between the base of transistor T1 and the cathode of the diode bridge and the anode of the SCR. Resistor R5 is connected between the collector of T1 and point 10 on the SCR gate trigger circuit. The gate of the SCR is isolated by transistor T1 from the positive terminal of the diode bridge, so that the high impedance condition through the circuit is maintained as long as the SCR remains non-triggered.

When the hold circuit is in its high impedance state, essentially no current flows through zener diode Z1 and hence there is no voltage applied across capacitor C3. When the SCR is triggered as described above, however, current flow is established through the zener diode Z1, the SCR and the LED. Capacitor C3 now charges to the zener breakdown voltage and transistor T1 is turned on in response to current flow through resistors R3 and R4. Resistor R5 thereupon causes point 10 to assume a voltage at least equal to the trigger voltage of the SCR. A subsequent interruption of loop current will cause the SCR to shut off due to current starving. In this event, capacitor C3 discharges via resistors R3 and R4. The time constant with respect to the discharge of capacitor C3 is of predeterminable value with respect to the resistances of R3 and R4 and is not affected by variations in loop current, because capacitor C3 is always charged to a predetermined voltage level by zener diode Z1. In the event loop current is restored while sufficient current is flowing through R3 during discharge of the capacitor C3 that transistor T1 is still conductive, the SCR is immediately retriggered and the hold mode is reestablished. In the event loop current is restored after capacitor C3 has discharged to the point that transistor T1 has become nonconductive, the SCR will not be retriggered and the circuit will remain in its high impedance state. The time period after loop current interruption during which restoration of loop current will retrigger the SCR is herein referred to as the hold delay period. This period is in part controlled by the gain and turn off voltage of transistor T1, and by the breakdown voltage of zener diode Z1. For a given zener diode Z1 and a given type of transistor T1, however, the upper and lower limits of the hold delay period may be controlled to within acceptable tolerances by appropriate selection of the capacitance and resistance values of capacitor C3 and resistors R3 and R4, respectively.

In a preferred embodiment, the circuit elements of the Figure have the following specifications:

| D1-D4 | IN 4002 |
| --- | --- |
| V1 | Breakdown voltage - 300 volts |
| SCR | EC 103D |
| LED | Red LED - 1.2 volts |
| Z1 | IN 4738 A |
| R1 | 3.6 K |
| R2 | 3.6 K |
| R3 | 10 K |
| R4 | 47 K |
| R5 | 47 K |
| R6 | 10 M |
| C1 | .01 µf |
| C2 | .02 µf 500 volts |
| C3 | 10 pf |
| T1 | 2N6520 |

In this preferred embodiment, the hold delay period will be greater than 300 ms. and less than 600 ms. The circuit will thus remain in the hold mode for all loop current interruptions of up to 300 ms., but will leave the hold mode for interruptions exceeding 600 ms.

Since the hold circuit of the present invention is comprised entirely of small, compact circuit elements, the line hold circuit may conveniently be enclosed in a small case and mounted adjacent the exterior of a telephone. When a telephone line has multiple extensions, a single hold circuit may be used, or multiple circuits may be associated with the several extension telephones. In such a case, any circuit may be used to enter the hold mode, and picking up any telephone on the line will cause the circuit to leave the hold mode.

Figure 2:
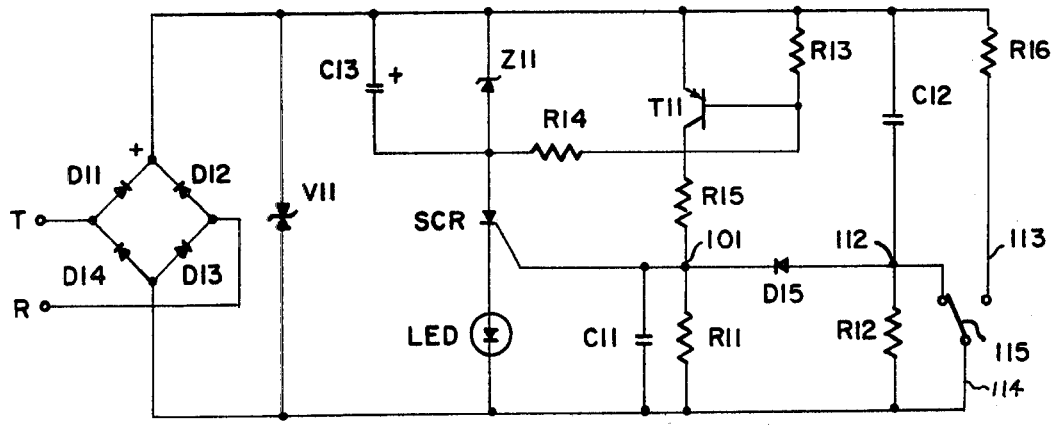
FIG. 2 is a schematic diagram of a second embodiment of the present invention.

FIG. 2 shows a second embodiment of the invention. In many telephone applications it is desirable to have a high input impedance of over 250 megohms under off-hook conditions.

In FIG. 2 diodes D11, D12, D13 and D14 perform similar functions and have similar values to diodes D1-4 in FIG. 1. V11 is similar to V1 in FIG. 1, but the embodiment shown in FIG. 2 has no resistor R6. Resistor R6 limits the input impedance in the FIG. 1 configuration; and, the circuit shown in FIG. 1 is therefore unsuitable for applications where a high input impedance is desirable. The SCR, LED, Zener Z11, C13, R14, T11, R15, R11, C11, C12, R12 and R13 of FIG. 2 correspond to SCR, LED, 21, C3, R4, T1, R5, R1, C1, C2, R2 and R3 of FIG. 1 respectively. In FIG. 2 a diode D15 replaces the momentary contact switch S1 of FIG. 1; and a resistance R16 is connected to the cathodes of the diodes D11 and D12. A two pole switch 115 has a first pole thereof connected to the anodes of the diodes D13 and D14 with the second pole thereof being selectively connectable to the anode of the diode D15 or to the resistance R16.

The circuit in FIG. 2 functions in the same manner as that of FIG. 1 with the following exception. Instead of discharging through a resistance in parallel with the varactor V1, as shown in FIG. 1, the capacitor C12 in FIG. 2 discharges through the resistance R16 when the switch 115 is connected to the resistance R16 to provide a discharge path for the capacitor C12. The gate of SCR is connected at all times to point 112 (corresponding to point 12 in FIG. 1) by diode D15. As is readily apparent SCR cannot fire when switch 115 makes a connection between points 112 and 114 as then the gate and cathode of the SCR are at the same potential. This is the case when there is no desire to hold. When switch 115 is connected between 113 and 114 and the contact to 112 disconnected, C12 discharges through R16 and R12 until 112 and 114 are at the same potential. Diode D15 acts as a through path for the circuit in the same manner as in the FIG. 1 embodiment. The diode D15 allows the hold circuit to function normally by allowing current from point 112 to reach point 101 but not allowing current from point 101 to reach point 112. If there were a bi-directional current path rather than the diode D15, between the gate of the SCR and point 112, current passed by activation of T11 would not result in the firing of the SCR as the gate and cathode of SCR would be connected by switch 115. D15 thus allows the voltage at point 101 to rise above that at point 114. The FIG. 2 interruption prevention circuit thus functions in the same manner as in FIG. 1.

Figure 3:
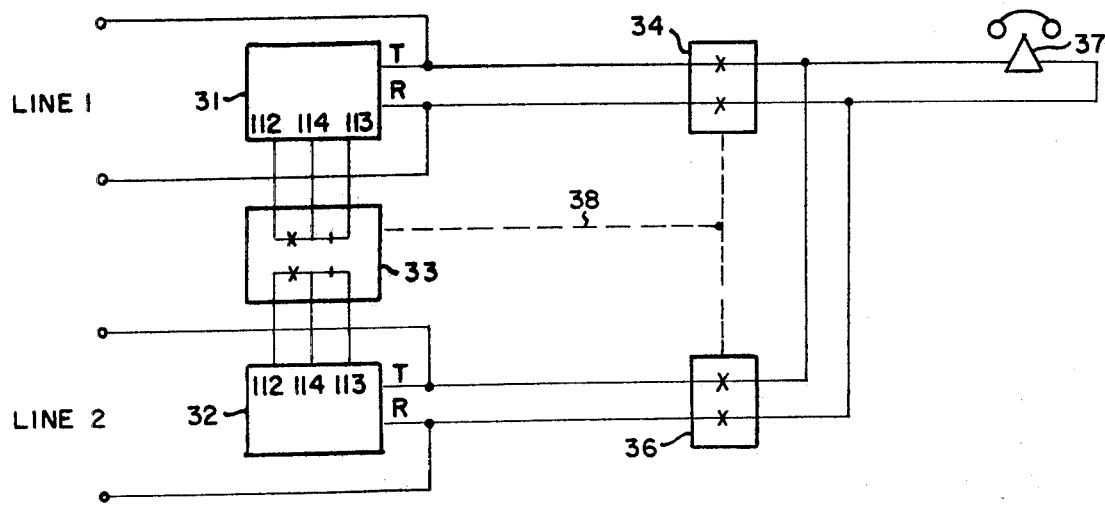
FIG. 3 is a schematic of a double line hold circuit.

FIG. 3 shows a two line hold circuit using a pair of single line hold circuits 31 and 32 according to the invention as illustrated in FIG. 2 with a momentary contact double make break switch 33, which functions as a hold button connected therebetween. A switch 34 and a switch 36 connect the line hold circuits 31 and 32, respectively, to a telephone 37 and are mechanically coupled by a mechanical connection 38 to switch 33. Mechanical connection 38 is such that either switch 34 or switch 36 may be locked in a down position making the contact; and if either switch 34 or switch 36 are locked down, then pressing the other of switches 34 or 36 will unlock the locked down switch and lock the switch being pressed. Pressing switch 33 will unlock switch 34 or switch 36 if either is locked and make momentary contact between points 113 and 114 in circuits 31 and 32. The telephone 37 is any standard telephone set.

In operation the device of FIG. 3 operates as follows. A call on either line 1 or 2 is originated or received normally by depressing switches 34 or 36. Assume line 1 is thus engaged and another call comes on line 2. To answer the call on line 2 the user presses the hold button 33 to place line 1 on hold in the normal manner of FIGS. 1 and 2. Mechanical connection 38 causes switch 33 to arm the circuit before (by about 10 ms.) switches 34 or 36 make the connection to line 1 or 2. Entry is thus made into the hold mode.

The user then actuates switch 36, which makes a connection to line 2, allowing the user to answer a call on line 2. After answering the call on line 2, the user then may press the hold button 33, placing line 2 on hold and releasing switch 36. The user then may press 34 and resume conversation on line 1. The device of FIG. 3 is more compact than devices utilizing electro mechanical means and may thus be used with decorative phones.

While the preferred embodiment of this invention has been illustrated and described herein, it should be understood that variations will become apparent to one skilled in the art. Accordingly, the invention is not to be limited to the specific embodiment illustrated and described herein and the true scope and spirit of the invention are to be determined by reference to the appended claims.

What is claimed is:

1. A single line hold circuit for connection to a telephone line, said telephone line having a tip lead and a ring lead with a telephone connected between said tip lead and said ring lead, comprising:
   a thyristor switchable between a low impedance state and a high impedance state, said low impedance state having an impedance sufficiently small to maintain the telephone in a hold condition;
   means for triggering said thyristor from the high impedance state to the low impedance state to establish a hold condition for said telephone;
   a Zener diode connected in series with said thyristor, said Zener diode having a reverse breakdown voltage of sufficient magnitude such that the voltage drop across the series connection of said thyristor in the low impedance state and said Zener diode is greater than the voltage drop between the tip and ring leads with the telephone in the off-hook position for switching said thyristor to the high impedance state when the telephone goes off-hook, thereby causing the telephone line to leave the hold mode; and
   hold maintenance means for causing said thyristor to be in the low impedance state when loop current in the tip and the ring leads resumes within a predetermined time after interruption of the loop current.

2. A single line hold circuit according to claim 1 wherein said hold maintenance means includes a capacitor connected in parallel with said Zener diode, a discharge circuit connected to said capacitor, and means for triggering said thyristor from the high impedance state to the low impedance state if the voltage across the capacitor exceeds a predetermined value when loop current in the tip and ring leads resumes within a predetermined time after interruption of the loop current.

3. A single line hold circuit according to claim 1, further including hold initiation means for selectively triggering said thyristor from the high impedance state to the low impedance state, the hold initiation means including a capacitor connected in parallel with the series connection of said Zener diode and said thyristor, and a switch for connecting said capacitor to selectively trigger said thyristor from the high impedance state to the low impedance state.

4. A single line hold circuit according to claim 3 further including a resistance selectively connectable across the capacitor to provide a discharge path therefor.

5. A single line hold circuit according to claim 3 further including a diode connected between the capacitor and the thyristor.

6. A single line hold circuit for connection to a telephone line, said telephone line having a tip lead and a ring lead with a telephone connected between said tip lead and said ring lead, for establishing a hold condition on said telephone line and for reestablishing a hold condition on said telephone line following interruption of loop current for a predetermined period, said hold circuit comprising:
   impedance means adapted for connection between the tip lead and the ring lead, the impedance means having a high impedance state and a low impedance state, the impedance of the low impedance state being small enough to maintain the telephone line in a hold condition, the impedance means including a Zener diode, said zener diode having a reverse breakdown voltage of sufficient magnitude such that the voltage drop across the impedance means in the low impedance state is greater than the voltage drop between the tip and ring leads with the telephone in the off-hook position, for causing the telephone to leave the hold condition when the telephone goes off-hook; and hold maintenance means for causing the impedance means to be in the low impedance state when loop current in the tip and ring leads resumes within a predetermined period of time after said loop current has been interrupted with the impedance means in the low impedance state, the hold maintenance means including a capacitor connected in parallel with the Zener diode, a discharge circuit connected to said capacitor, and means for triggering the impedance means from the high impedance state to the low impedance state when the voltage across the capacitor exceeds a predetermined value.

7. A double line hold circuit adapted for connection to two telephone lines, each telephone line having a tip lead and a ring lead with a telephone connected between the two telephone lines, for establishing a hold condition on one of said telephone lines and for reestablishing a hold condition following interruption of loop current for a predetermined period, comprising:

first single line hold circuit means for establishing a hold condition on said first telephone line;

second single line hold cirucit means for establishing a hold condition on the second telephone line; and switch means for selectively placing one of said two telephone lines in a hold condition and making a line connection to the other of said two telephone lines.

8. A double line hold circuit as in claim 7 wherein said switch means includes hold connection means for making a hold connection and line connection means for making a line connection, the hold connection and the line connection being made substantially simultaneously.

9. A double line hold circuit as in claim 8 wherein said hold connection means is mechanically connected to said line connection means.

10. A double line hold circuit as in claim 8 further including means for making a hold connection in one of the telephone lines substantially simultaneously with a telephone disconnection on the other of the telephone lines.

11. A double line hold circuit as in claim 7 wherein said first and second single line hold circuit means each include hold maintenance means for maintaining a hold mode when current in the corresponding tip and ring leads resumes within a predetermined period of time after interruption of said loop current while the single line hold circuit is in the hold mode.

12. A single line hold circuit for holding a call on a communication line, comprising:

a switching circuit for connection across said communication line, said switching circuit selectively switchable between a high impedance state and a low impedance state, said low impedance state establishing a hold mode for the communication line;

means for selectively triggering said switching circuit from the high impedance state to the low impedance state to establish said hold mode;

voltage control means for selectively terminating said hold mode when said switching circuit is in said low impedance state; and hold maintenance means for maintaining the hold mode for a predetermined hold maintenance time after interruption of electrical current in said communication line.

13. A single line hold circuit according to claim 12 wherein said voltage control means includes a Zener diode, said Zener diode having a reverse breakdown voltage of a magnitude sufficient to terminate said hold mode.

14. A single line hold circuit according to claim 13 wherein said switching circuit includes a thyristor, said thyristor having a thyristor anode, a thyristor cathode and a thyristor gate, and wherein said Zener diode has a Zener diode anode and a Zener diode cathode, said thyristor anode connected to said Zener diode anode.

15. A single line hold circuit according to claim 14 wherein said thyristor is a silicon controlled rectifier.

16. A single line hold circuit according to claim 14 wherein said means for selectively triggering said switching circuit from the high impedance state to the low impedance state includes a triggering capacitor connected between said thyristor cathode and said Zener diode cathode and means for connecting said triggering capacitor to said thyristor gate to supply a triggering signal to said thyristor gate to trigger said thyristor from a high impedance state to a low impedance state.

17. A single line hold circuit according to claim 16 wherein said hold maintenance means includes means for triggering said thyristor from the high impedance state when electrical current in said communication line resumes within said hold maintenance time after interruption of said electrical current.

18. A single line hold circuit according to claim 17 wherein said hold maintenance means includes a second capacitor connected to said voltage control means to receive a predetermined voltage therefrom during said hold mode and a discharge path for said second capacitor, said hold maintenance time being determined by the time for the discharge of said capacitor to a predetermined voltage.

* * * * *

UNITED STATES PATENT AND TRADEMARK OFFICE
CERTIFICATE OF CORRECTION

PATENT NO. : 4,258,232
DATED : March 24, 1981
INVENTOR(S) : Maurice I. Smith and John D. Gillen It is certified that error appears in the above–identified patent and that said Letters Patent are hereby corrected as shown below:

Column 7, line 11 insert--the switch S1--after "as."

Signed and Sealed this

First Day of December 1981

[SEAL]

Attest:

Attesting Officer

GERALD J. MOSSINGHOFF

Commissioner of Patents and Trademarks